Patented May 31, 1927.

1,630,756

UNITED STATES PATENT OFFICE.

CLINTON H. PARSONS, OF CHICAGO, ILLINOIS, ASSIGNOR TO SWIFT & COMPANY, OF CHICAGO, ILLINOIS, A CORPORATION OF ILLINOIS.

EGG PRODUCT AND METHOD OF MAKING SAME.

No Drawing.   Application filed November 8, 1924.   Serial No. 748,527.

The present invention relates to the production of new homogeneous egg products, and includes the new homogeneous egg products themselves, as well as the new and improved methods of producing them. More particularly the invention relates to the production of a new homogeneous liquid egg product, as well as the production of a new homogeneous frozen egg product, and a new homogeneous dry egg product, and includes such homogeneous products as new products as well as the processes for producing them.

The ordinary liquid egg products heretofore prepared have been prepared by breaking the eggs and either separating the yolk from the white and treating each separately, or by allowing the whole eggs as they are separated from their shells to discharge into a container where they are mixed together, either by hand or mechanically, to produce the liquid egg product. The method of mixing the eggs is of such a nature that a homogeneous product is not produced, and effective emulsification of the whites and yolks is not obtained. In such methods, moreover, little or no attention is paid to the physical structure of the egg, and the liquid egg products contain the yolks and whites admixed with the germs, white and yolk membranes, and strings or chalazæ which in the unbroken eggs hold the yolk in suspension within the white. Attempts have been made to remove the germs, membranes, and strings or chalazæ by screening, but such methods effect only partial removal and involve loss of egg substance. The ordinary methods of mixing moreover tend to beat air into the eggs, which is objectionable.

After the eggs have been separated from their shells they will not keep long without decomposition, unless preserved. If kept without proper preservation, the eggs undergo incubation and decomposition, with resulting increase in bacterial content, development of objectionable taste and odor, and resulting spoilage. Where the use of preservatives for preventing decomposition is not legally permitted, freezing of the liquid egg product has been resorted to, the egg being subjected to such temperature as to bring the product into a frozen state and being held in this state at a low temperature until ready for consumption.

The usual method of preserving liquid eggs by freezing is to fill the eggs into suitable cans of commercial size, usually from 10 to 50 pound cans, and to transfer the filled cans to a refrigerated room maintained at a low temperature, about 0° F. A considerable period of time is necessary to bring the eggs to the frozen state, especially when contained in the larger sizes of cans, such as 30 pound cans or cans of larger size. As much as 96 hours or more may be required for this freezing operation. After the egg has been frozen in the cans, the cans are maintained at sufficiently low temperature to keep the eggs in a frozen state until ready for use.

Such methods of preserving liquid eggs by freezing are open to various objections, among which may be mentioned the following: The freezing process is a slow process, and requires a long period of time, particularly with the larger sizes of commercial cans. In the initial stages of the freezing period, a considerable portion of the liquid egg, particularly that near the center of the can, is maintained at a sufficiently high temperature so that a good deal of incubation of the egg takes place. If the egg already has a high bacterial content, or a slightly musty odor, this incubating period tends to increase the bacterial content and the odor and may in certain cases result in spoilage of the liquid egg product. Furthermore, during the long period of freezing required for the larger sizes of commercial cans, the ice crystals formed by the freezing operation increase in size and very large ice crystals are usually present in the frozen products particularly in the central part of the can. When eggs so frozen are allowed to thaw slowly, a thawed product is obtained in which a good deal of egg separation has taken place. When such a thawed product is used, for example, by a baker, he is apt to get a non-homogeneous product unless he takes the precaution of thawing and mixing a whole can, particularly as the heavier part of the separated egg substance tends to settle to the bottom of the container. This condition is not only a cause of annoyance and actual loss to the producer and the baker, but may result in the turning out by the baker of an inferior product, owing to the fact that he may not have used the proper amount of egg products in his baked article. The lack of homogeneity and of uniformity in the original liquid egg product before freezing is magnified by the slow freezing process with its relatively rapid freezing of the liquid egg near the walls of the can and its much slower freezing of the liquid egg in the middle of the can with resulting formation of larger ice crystals in the more slowly frozen portion of the liquid egg product.

According to the present invention, the objections and objectionable features above mentioned are overcome or minimized; and the present invention provides an improved process for producing a homogeneous liquid egg product, and also an improved process for converting the homogeneous liquid egg product into a homogeneous frozen egg product, as well as an improved method of producing a homogeneous dry egg product. The homogeneous egg products themselves also constitute a part of the invention.

According to the present invention, the eggs are subjected to a grinding operation by passing them through a grinding machine such as a stone mill and the liquid egg is thereby converted into a uniform and homogeneous and emulsified product.

In carrying out the present process, the eggs may be broken and separated from their shells in the usual way, and either the whites alone or the yolks alone or both together collected and subjected to the grinding operation. The grinding operation is of such a character that an effective grinding of all parts of the egg product will be effected. While various grinding machines, may be used, a stone mill is particularly advantageous. The germs, membranes, strings or chalazæ, which are objectionable in ordinary liquid egg products, are ground up and disintegrated and emulsified with the yolk and white during the grinding operation thus producing a homogeneous emulsified egg product. In separating the eggs from their shells the shell membrane remains with the shell, but the cell membrane of the white of the egg, and the membrane surrounding the yolk, as well as the germ or germinal vesicle, and the strings or chalazæ are ground up and lose their identity and are in a sufficiently finely divided state to be unobjectionable in the liquid egg product. The grinding operation also effects an emulsification of the liquid egg constituents with resulting production of a homogeneous emulsified liquid egg product. The grinding operation is moreover carried out without beating in or incorporation of air.

The resulting liquid egg product is a new product. It is of a homogeneous emulsified character and can be readily and uniformly mixed with whatever medium the user may desire to mix it. For example, the new liquid egg product may be used by bakers and mixed into the constituents of the dough batch or other batch as a homogeneous liquid and without danger of separation or lack of uniformity. It is free from membranes, strings, and germs of the kind commonly found in liquid egg products, and contains the constituents of the membranes, strings and germs in such a finely divided state that the product can be used, for example, in making the finest custards without the usual drawbacks of hard particles being present in the finished product. For cooking and baking purposes, therefore, the new liquid egg product presents marked advantage.

The new homogeneous liquid egg product of the present invention can be used directly, in a freshly prepared state, without preservation. It can also be used in making the new dry homogeneous egg product, and the new frozen homogeneous egg products of the present invention.

In forming a dry homogeneous egg product, according to the present invention, the homogeneous liquid egg product is subjected to a drying operation. Owing to the uniform and homogeneous and emulsified condition of the liquid egg product it can be dried to give a homogeneous dry egg product in which the constituents of the original eggs are uniformly blended and admixed, without the lack of uniformity and presence of membranes, germs, strings, etc., characteristic of dried egg products produced from ordinary liquid egg products.

By carrying out the drying process at a low temperature, for example, at a temperature around 37 to 40° C., for a sufficient period of time to remove moisture from the product, a dry egg powder can be produced of a finely divided and homogeneous character well adapted for use for cooking and baking purposes. By carrying out the drying operation in an inert gas, such as carbon dioxide or nitrogen, instead of in the air, the egg can be protected from oxidation during the drying operation; and by then packaging the dry egg product in a package in an atmosphere of the inert gas, it can be further protected from oxidation in the package.

Instead of carrying out the drying operation at a low temperature, a higher temperature, above that of the coagulation or cooking of albumin may be similarly used, and an egg powder produced more in the nature of a cooked egg powder, for example, where the drying operation is carried out at a temperature above 212° F.

The dry egg product in powder form will have advantages and properties similar to those of the homogeneous liquid egg product, except for the difference in physical conditions and the changes, such as coagulation or cooking, which may take place during the drying operation. The egg powder will be of a similar homogeneous character with the various constituents intimately and uniformly blended together, and will be free from large particles of germs, membranes, etc.

In the production of a frozen egg product, according to the present invention, the liquid egg product is subjected to a substantially instantaneous freezing process by which the liquid egg is rapidly frozen. For example, the liquid egg product can advantageously be subjected to refrigeration by the use of a refrigerated roll in which a refrigerated fluid is circulated, and by allowing the outside surface of the roll as it rotates to dip into a container of the liquid egg, then scraping the frozen egg from the roll after it has made somewhat less than one revolution. This chilling or freezing operation can advantageously be carried out in a vacuum or an atmosphere of an inert gas such as carbon dioxide or nitrogen, and with avoidance of contact with the air. Instead of carrying out the freezing operation in such an inert atmosphere or in a vacuum, the frozen product may be subjected to a vacuum to eliminate any objectionable gases and admixed air. During the freezing operation, the gases contained in the egg product are largely eliminated or frozen out, and these can be removed from admixture with the frozen products by subjecting it to a vacuum. The product after having been thus subjected to a vacuum may then be packaged in containers maintained under a vacuum or in containers in an atmosphere of inert gas.

Instead of freezing the eggs on a rotating refrigerated roll the egg may be frozen in a jacked tank, through the jacket of which a refrigerated fluid is circulated at a sufficiently low temperature. By providing an agitator and rapidly agitating the contents of the tank to maintain the contents in motion during the freezing operation, the entire contents of the tank can be rapidly frozen and a substantially uniform frozen product produced. The substantially instantaneous freezing of the product on a refrigerated roll or by a similar substantially instantaneous and continuous process is however more advantageous. The frozen egg product, frozen rapidly in the manner described, will resemble ice-cream somewhat in texture. Owing to the rapid freezing to which the product is subjected, the crystals of water formed will be small and substantially uniform in size. These very fine crystals produced by rapid freezing distinguish the product from products produced by slow freezing during which the growth of large crystals takes place. The new frozen product is furthermore distinguished from frozen egg products heretofore produced by a substantially uniform and homogeneous character, in much the same manner that the new homogeneous liquid egg product of the present invention is distinguished from liquid egg products heretofore produced.

The rapid freezing to which the liquid egg is subjected, according to the present invention, checks for the most part any increase in bacteria and correspondingly prevents spoilage of the egg. So also, where the egg contains gases, these will be eliminated to a large extent by the freezing operation when the liquid egg is spread out on the roll and a large thin surface is exposed to the air. Odors are thus largely removed from the eggs and this removal may be supplemented by a vacuum treatment of the product. The new frozen egg product of the present invention is particularly advantageous because of its uniform and homogeneous character such that it can be thawed without separation of the egg substances from each other to any appreciable or objectionable extent. The user can accordingly thaw and use a part only of the contents of the can, or the entire contents of the can with full assurance that whatever part he uses will represent the average contents of the can; or, in other words, he can be sure of getting the correct proportions of eggs in his product at all times, and moreover eggs of uniform composition. Furthermore, the intimate and homogeneous character of the liquid egg product before freezing and the fact that the frozen product can be thawed to give a similar homogeneous liquid egg product, enables the product after freezing and melting to be used with practically the same facility as the freshly prepared liquid egg product. The frozen egg product, upon thawing, partakes of the consistency of a stiff mayonnaise or salad dressing and without liquid separation. Owing to its uniform and homogeneous character, it can be readily stirred into the dough batch or other food products into which it is to be incorporated.

In the commercial practice of the process of the present invention, the eggs can be ground and emulsified and then subjected immediately to the rapid freezing process to form the frozen homogeneous egg product; or the eggs can be ground and emulsified and then subjected to a drying operation to give the dried homogeneous egg product; or the eggs can be subjected to the grinding and emulsifying process and then filled directly into cans and sold as such, if handled promptly. The different egg products can be produced as desired.

Instead of subjecting the eggs without admixture to the freezing process of the present invention, the eggs may have additions of various kinds made to them. If, desired, the eggs may be treated with some protective colloid or other substance such as gelatin, glucose, dextrin, lactose or glycerin, and the incorporation of such substance permits the freezing process to be conducted over a somewhat longer period of time, while giving a product having very fine crystals and a smooth texture.

It will thus be seen that the present invention provides a new method for producing a homogeneous and emulsified liquid egg product, as well as the new liquid egg product itself, in which the germs, membranes, and strings or chalazæ have been effectively ground up and emulsified with the yolks and whites of the eggs so that the product is a homogeneous emulsified liquid egg product. It will also be seen that the invention provides a new and improved process of producing a frozen homogeneous egg product and an improved frozen product of a homogeneous character and having very fine crystals and a texture somewhat similar to that of ice-cream, and which does not separate to any appreciable extent on thawing. It will also be seen that the invention provides a new and improved dry egg product of a homogeneous character together with the new and improved method of producing it. Where the new egg products of the present invention are produced from separated whites or separated yolks, they will be similarly characterized by having the membranes or germs, etc., ground up and incorporated in a substantially homogeneous form so that the product will be a substantially homogeneous egg product. Where the yolks and whites are kept together, the product of the present invention will contain the entire constituents of the egg, other than the shell and shell membrane, in a uniform and homogeneous condition.

I claim:

1. The method of producing a liquid egg product, which comprises subjecting eggs, freed from their shells, to a grinding operation, whereby the non-liquid parts of the eggs, such as the germs, membranes, and strings, are ground and admixed in a finely divided state with the other constituents of the eggs to form a substantially homogeneous liquid egg product.

2. The method of producing a liquid egg product, which comprises subjecting eggs, freed from their shells, to a grinding operation of such a character that the germs, strings and interior membranes of the eggs are finely divided and effectively emulsified with the whites and yolks, thereby forming a substantially homogeneous liquid egg product.

3. The method of producing a liquid egg product from the yolks of eggs, which comprises subjecting the yolks to a grinding operation of such a character that the nonliquid parts, such as the germs, strings and interior membranes, are finely divided and effectively admixed with the other constituents of the yolks to form a substantially homogeneous liquid egg product.

4. The method of producing a homogeneous frozen egg product which comprises subjecting a homogeneous liquid egg product containing the germs, strings and membranes of the eggs to a rapid freezing treatment whereby all parts of the homogeneous liquid egg products are rapidly converted into a homogeneous frozen egg product.

5. The method of producing a homogeneous frozen egg product containing the germs, strings and membranes of the eggs which comprises causing relatively thin layers of a homogeneous liquid egg product to contact with a refrigerating surface and rapidly freezing such thin layers, and removing the frozen egg product from the refrigerating surface.

6. The method of producing a homogeneous frozen egg product which comprises subjecting a homogeneous liquid egg product containing the germs, strings and membranes of the eggs admixed with a protective colloid, to a rapid freezing treatment whereby all parts of the homogeneous liquid egg products are rapidly converted into a homogeneous frozen egg product.

7. The method of producing a homogeneous frozen egg product which comprises subjecting the eggs to a grinding operation, whereby the non-liquid parts of the eggs such as the germs, strings, and interior membranes are finely divided and effectively admixed with the other constituents of the eggs to form a substantially homogeneous liquid egg product, and rapidly freezing the homogeneous liquid egg product to produce a homogeneous frozen egg product.

8. A homogeneous liquid egg product in which the non-liquid parts, such as the germs, strings, and interior membranes are finely divided and effectively admixed with the other constituents of the eggs in the form of a homogeneous liquid egg product.

9. A homogeneous liquid egg product containing the yolks of the eggs intimately admixed with the ground up non-liquid parts of the eggs, such as germs, strings, and interior membranes, and combined therewith to form a substantially homogeneous liquid egg product.

10. A homogeneous frozen egg product containing the non-liquid parts of the egg such as the germs, strings and interior membranes in finely divided condition, and effectively admixed with the other constituents of the eggs, said product being capable of being thawed without liquid separation.

11. A homogeneous frozen egg product containing the yolks of the eggs intimately admixed with the ground-up non-liquid parts of the eggs, such as the germs, strings and interior membranes in finely divided condition, said product being capable of being thawed without liquid separation.

In testimony whereof I affix my signature.

CLINTON H. PARSONS.